Aug. 28, 1923.
R. M. SMYTHE
DISH DRAINER
1,466,514
Filed June 16, 1921
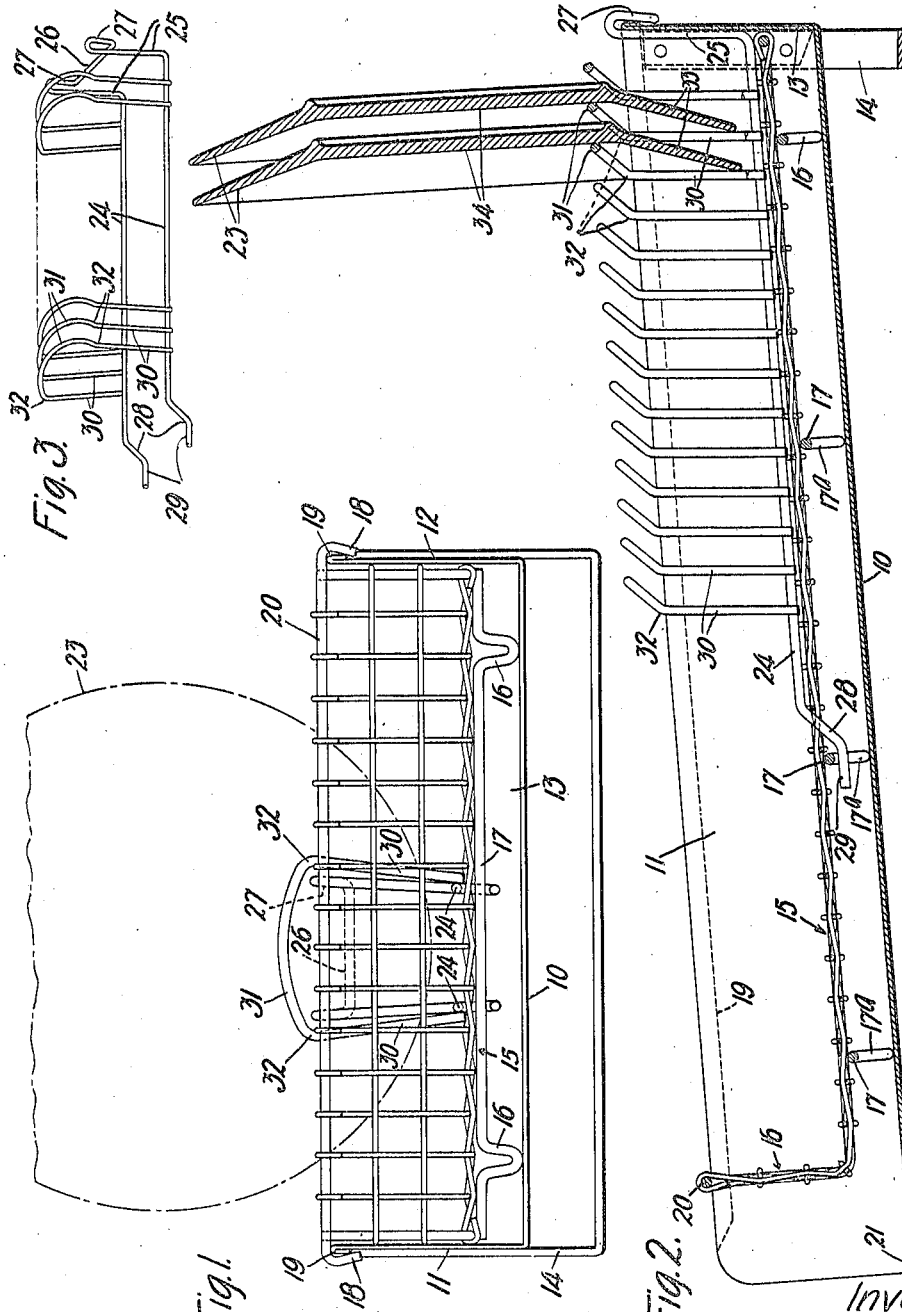
Inventor:
Richard M Smythe
by B C Stickney
Att'y Patented Aug. 28, 1923.

1,466,514

UNITED STATES PATENT OFFICE.

RICHARD M. SMYTHE, OF BOONTON, NEW JERSEY, ASSIGNOR, BY MESNE ASSIGNMENTS, TO REX METAL PRODUCTS CO., INC., OF BROOKLYN, NEW YORK, A CORPORATION OF NEW YORK.

DISH DRAINER.

Application filed June 16, 1921. Serial No. 477,912.

*To all whom it may concern:*

Be it known that I, RICHARD M. SMYTHE, a citizen of the United States, residing in Boonton, in the county of Morris and State of New Jersey, have invented certain new and useful Improvements in Dish Drainers, of which the following is a specification.

This invention relates to kitchen utensils adapted for the rinsing and drying of dishes.

The device comprises a draining pan containing a floor in the form of a grid upon which dishes are placed, the floor being inclined so that the water may flow out an open end of the draining pan. The grid has a bent-up end which is provided with hooks to clasp the sides of the draining pan, so that it is firmly held in the pan, while it is readily detachable to conduce to cleanliness in washing the pan as well as the grid.

A novel dish-rack is employed, comprising a set of spaced rack-members and a support therefor, the support having a portion to hook over the rear end of the draining pan, and also having a portion at its front end to pass down through the meshes of the grid and lock beneath the latter. This dish-rack is thus readily detachable for cleaning the rack, grid and pan. The rack is so constructed that dishes dropped between the rack-members are clasped thereby, and kept separated from one another, so that the rinsing water has access to all portions of each dish, and also so that the dishes may readily dry. In practice, the apparatus is so efficient that the dishes may be allowed to stand until dry, the use of the drying towel being rendered unnecessary.

Other features and advantages will hereinafter appear.

In the accompanying drawings,

Figure 1 is an end elevation of my improved drainer, showing in dot-and-dash lines a dish set up in the dish-rack.

Figure 2 is a sectional longitudinal elevation of the drainer, showing in section some dishes set up in the rack.

Figure 3 is a perspective of the detachable drainer.

The pan-shaped drainer comprises an inclined bottom 10, sides 11, 12 and rear end 13, the drainer being open at its front end. The rear end of the drainer is elevated by a foot 14. The drainer is stamped out from one piece, to minimize or avoid joints and hence conduce to cleanliness.

In the drainer is set a grid 15, to form a floor upon which the dishes rest, the dishes being confined partly by the sides and end of the drainer, and partly by a turned-up end 16 formed on the grid near the open end of the drainer-pan. This grid 15 forms the dish floor of the draining device, and is supported in the bottom portion of the draining pan by means of feet $17^a$, which are bent down from cross-rods or supports 17, forming portions of the skeleton of the grid. These feet are of the same length, so that the grid is inclined to the same extent as the bottom 10 of the drainer-pan.

In washing the device, it is only necessary to withdraw the grid, which may be readily cleansed, the same being true of the drainer-pan. In replacing the grid, hooks 18 catch over the folded-over top edges 19 of the drainer-pan and clasp the same, whereby the grid is firmly retained in the pan. The hooks 18 may consist of the turned-down ends of a transverse rod 20 forming part of the turned-up end 16 of the grid skeleton or frame. The drainer-pan has a prolongation or discharge lip 21 extending beyond the end 16 of the grid, to overhang the edge of the sink 22.

To increase the capacity and usefulness of the drainer, I provide a rack which is supplemental to the grid and which is adapted to hold plates 23, or saucers or other dishes, on edge close together, with their bottom edges out of contact with water that may drip on the floor of the pan. This rack may comprise a pair of rods 24, which form the floor or bottom portion of the rack, and are bent up at their rear ends at 25 to lie against the end of the draining pan; these bent portions 25 being connected by a yoke 26, which bends over the top edge of the draining pan to form hooks 27, whereby the rack is held in place.

At their forward ends, the rods 24 (which are above the grid 15) are bent downwardly at 28 to pass through the meshes of the grid 15, and are also extended forwardly at 29 to pass under one of the cross-rods 17 of the grid skeleton, whereby the rack is locked against rising at its forward end. The bars 24 incline downwardly from their rear ends. To detach the rack, it is only necessary to lift up the hook portion 27, and tilt the rack further until the locking portion 28, 29, can be withdrawn from the grid; or rack and grid may be lifted or displaced together at the pan-cleaning operation.

From said bottom bars 24 rise vertical dish-supporting rack-members, each in the form of a loop, of which the sides are designated as 30, and the yoke or connecting member as 31. At their lower ends the loops may be soldered or otherwise rigidly connected to the parallel floor-rods 24. The curved bow portion 31 of each loop is bent backwardly to form a pair of shoulders 32, these shoulders forming a support for the flange portion 33 of a dish inserted between the rack-members or loops. As a dish is dropped between adjacent rack-members, the inclined beveled flange of the dish, contacting with shoulders 32, tends to throw the dish forwardly until its rim comes to rest against the sides or legs 30 of the loops, and until the bottom 34 of the dish engages at its front side the bent-back loop 31, as illustrated at Figures 1 and 2. The dish is thus suspended or comes to rest at a point above the floor of the rack, and is held with relative firmness, so that the dishes will not sway or pack against one another, but will remain separated, thereby favoring both the rinsing and drying operations.

The detachment feature of the dish-rack conduces to cleanliness, because when detached it may be readily washed. The rack may be made and sold as a separate article of manufacture, and may be placed in different positions from side to side of the draining pan, the latter being usable without the rack when desired.

Variations may be resorted to within the scope of the invention, and portions of the improvements may be used without others.

Having thus described my invention, I claim:

1. In combination, a drainer-pan, a detachable grid in said pan, and a detachable plate-rack comprising both a set of spaced rack members and supporting means therefor, said supporting means having at one end means to hook over the drainer-pan, and also having means at its other end to pass through the meshes of the grid to lock the rack.

2. A dish-draining rack comprising spaced rack members having co-operating portions whereby the dish may be clasped and suspended by adjacent rack members, each rack member having means to engage the beveled flange of one dish and the edge and bottom of the next dish.

3. A dish-rack for use in a draining tray having a grid therein, said rack comprising a pair of rods to form the bottom portion of the rack, and spaced rack members upon said rods, said rods bent up at their rear ends and connected by a yoke having the form of a hook to clasp over the end of the dish-drainer, the rods at their forward ends being bent downwardly to pass through meshes of the grid.

4. A dish-draining rack comprising rods and spaced rack members rising therefrom and having co-operating portions whereby the dish may be clasped and suspended by adjacent rack members, each of said rack members comprising sides rising from the rods, and a yoke portion connecting said sides, said yoke portion bent backwardly to leave side-shoulders to engage the beveled flange of one dish and to form a support for the bottom of the next dish, to co-operate with the legs of said rack member and the shoulders of the adjacent rack member for supporting the dish.

5. A tilted drainer-pan having a bottom and sides and open at its lower end and closed at its upper end, said pan containing a floor in the form of a detachable grid, the grid having feet to rest upon the bottom of the drainer-pan and having a bent-up lower end having hooks to clasp the sides of the drainer-pan, and a dish-rack rising from said grid and comprising a set of rack members, each of which has sides and a bent-back yoke connecting said sides at their upper ends.

6. In combination, a drainer-pan, a detachable grid in said pan, and a detachable plate-rack comprising both a set of spaced rack members and a support therefor, each of said rack members comprising sides and a yoke portion connecting said sides, said yoke portion bent backwardly to leave side-shoulders to engage the beveled flange of one dish and to form a support for the bottom of the next dish, to co-operate with the legs of said rack member and the shoulders of the adjacent rack member for supporting the dish.

7. In combination, a drainer-pan, a grid in the bottom portion of said pan and forming a draining floor for the dishes, and a plate-rack within said pan and upon said grid and detachably connected to the grid and pan.

8. As a new article of manufacture, a tilted drainer-pan having sides, an open end and a closed end, a grid having feet to support it upon the bottom of said drainer-pan and also having hooks to catch upon the sides of the drainer-pan, and a plate-rack having a hook to catch upon the end of the drainer-pan.

9. As a new article of manufacture, a tilted drainer-pan having sides, an open end and a closed end, a grid having feet to support it upon the bottom of said drainer-pan and also having hooks to catch upon the sides of the drainer-pan, and a plate-rack having a hook to catch upon the end of the drainer-pan and detachably locked to the grid by means of projections or tongues which extend from the plate-rack through the meshes of the grid and catch underneath the same.

10. A dish-drier comprising a plate-rack, an inclined drainer-pan within which the plate-rack is confined, and means supporting said plate-rack against accidental disarrangement, said drainer-pan open only at its lower end, said plate-rack supported above the floor of the drainer-pan and including loops extending transversely of the length of the pan, and constructed and mounted to enable plates set down edgewise therein to clear the pan-floor and the drip water thereon, said rack-supporting means constructed to permit relative displacement between the pan and the rack, to give access to both thereof for cleaning them.

11. A dish-drainer pan open only at one end and with one end held above the other having a plate-rack including loops extending transversely of the pan and confined therein, and a frame carrying said plate-rack in said pan, the recited elements comprising a transverse rod engaging the tops of the sides of the drainer-pan near the open end thereof, and said frame supported partly by said rod, and provided with feet to rest upon the pan floor, whereby the frame and rack are supported at a distance above said floor; the rack with the frame being displaceable relatively to the pan for cleaning purposes.

RICHARD M. SMYTHE.

Witnesses:
CATHERINE A. NEWELL,
JENNIE P. THORNE.